United States Patent
Wong et al.

(10) Patent No.: US 10,185,627 B2
(45) Date of Patent: Jan. 22, 2019

(54) SYNCHRONIZED TEST MASTER

(71) Applicant: ORACLE INTERNATIONAL CORPORATION, Redwood Shores, CA (US)

(72) Inventors: Adrienne Wong, Foster City, CA (US); Sreeji Das, Fremont, CA (US); Chandra Komali, Fremont, CA (US); Aruna Venkataramani, Hyderabad (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 455 days.

(21) Appl. No.: 14/953,902

(22) Filed: Nov. 30, 2015

(65) Prior Publication Data

US 2017/0116220 A1    Apr. 27, 2017

Related U.S. Application Data

(60) Provisional application No. 62/245,315, filed on Oct. 23, 2015.

(51) Int. Cl.
*G06F 11/14* (2006.01)

(52) U.S. Cl.
CPC ...... *G06F 11/1446* (2013.01); *G06F 11/1448* (2013.01); *G06F 11/1458* (2013.01); *G06F 11/1471* (2013.01); *G06F 11/1451* (2013.01); *G06F 2201/80* (2013.01); *G06F 2201/84* (2013.01)

(58) Field of Classification Search
CPC combination set(s) only.
See application file for complete search history.

(56) References Cited

U.S. PATENT DOCUMENTS

| | | | |
|---|---|---|---|
| 7,337,176 B1 * | 2/2008 | Cheedella | G06F 17/30563 |
| 8,417,905 B2 * | 4/2013 | Linde | G06F 11/1466 |
| | | | 707/649 |
| 9,378,149 B1 * | 6/2016 | Bonwick | G06F 12/0246 |

(Continued)

OTHER PUBLICATIONS

Evans, Woody; Understanding SnapSync and LogSync for Oracle; posted May 6, 2013; pp. 1-5; downloaded Nov. 16, 2015 from: http://blog.delphix.com/woody/2013/05/06/understanding-snapsync-and-logsync-for-oracle/.

*Primary Examiner* — Etienne P Leroux
(74) *Attorney, Agent, or Firm* — Tarolli, Sundheim, Covell & Tummino LLP

(57) ABSTRACT

Systems, methods, and other embodiments associated with a synchronized test master are described. In one embodiment, a method periodically synchronizing test master data to a source database by, at a synchronization time: modifying the test master data to reflect changes to the source database since a last synchronization time; populating a transaction log with data manipulation operations performed on the source database since a last transaction time; and taking a snapshot of the test master data. Synchronization data is derived from the transaction log that includes a snapshot time for the snapshot and a modification time for each data manipulation operation in the transaction log. The method includes storing the synchronization data and snapshot for use in generating a test database that represents a point-in-time version of the source database.

20 Claims, 7 Drawing Sheets

(56) References Cited

U.S. PATENT DOCUMENTS

| | | | |
|---|---|---|---|
| 9,652,741 B2* | 5/2017 | Goldberg | G06Q 10/101 |
| 2002/0174136 A1* | 11/2002 | Cameron | G06F 17/30595 |
| 2005/0229159 A1* | 10/2005 | Haba | G06F 11/3672 |
| | | | 717/122 |
| 2014/0019421 A1* | 1/2014 | Jagadeesan | G06F 11/1469 |
| | | | 707/687 |
| 2015/0052108 A1* | 2/2015 | Volk | G06F 11/1446 |
| | | | 707/649 |
| 2015/0134615 A1* | 5/2015 | Goodman | G06F 3/0617 |
| | | | 707/639 |

* cited by examiner

SYNCHRONIZED TEST MASTER

CROSS REFERENCE TO RELATED APPLICATIONS

This disclosure claims the benefit of U.S. Provisional Patent Application Ser. No. "62/245,315" filed Oct. 23, 2015, titled "SYNCHRONIZED TEST MASTER", inventors: Wong, Das, Komali, and Venkataramani, and assigned to the present assignee.

BACKGROUND

It is often helpful to create a test instance of a production database at a particular point-in-time for debugging database operations, testing new applications that access the database, and other experimental purposes. The test instance should allow a tester to modify data in the test instance without modifying the data in the production database. It is not uncommon for multiple independent test instances of a production database to be in use at the same time.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

A test instance is typically a test database created by locating a backup version of the production database, copying the backup version in full to storage designated for the test database, and then applying data manipulation operations that have been logged since backup time to bring the test database up to date with a desired point-in-time. This process is time consuming and results in a test database that consumes the same amount of storage space (e.g., storage media) as the production database itself. When several test databases are in use, several copies of the production database are stored, using large quantities of storage space.

Systems and methods are described herein that provide a test database that is an instance of a source (e.g., production) database that does not require a full copy of the source database that is dedicated to the test database. To support any number of test databases, a test master is created that includes a single copy of the source database. The test master is kept in sync with the source database. Periodically, snapshots of the test master are taken to provide a means to quickly synchronize with the production database while conserving storage space. The test database provided by the system is a snap clone of the test master which is provisioned using one of the stored snapshots, saving time and storage space.

Figure 1:
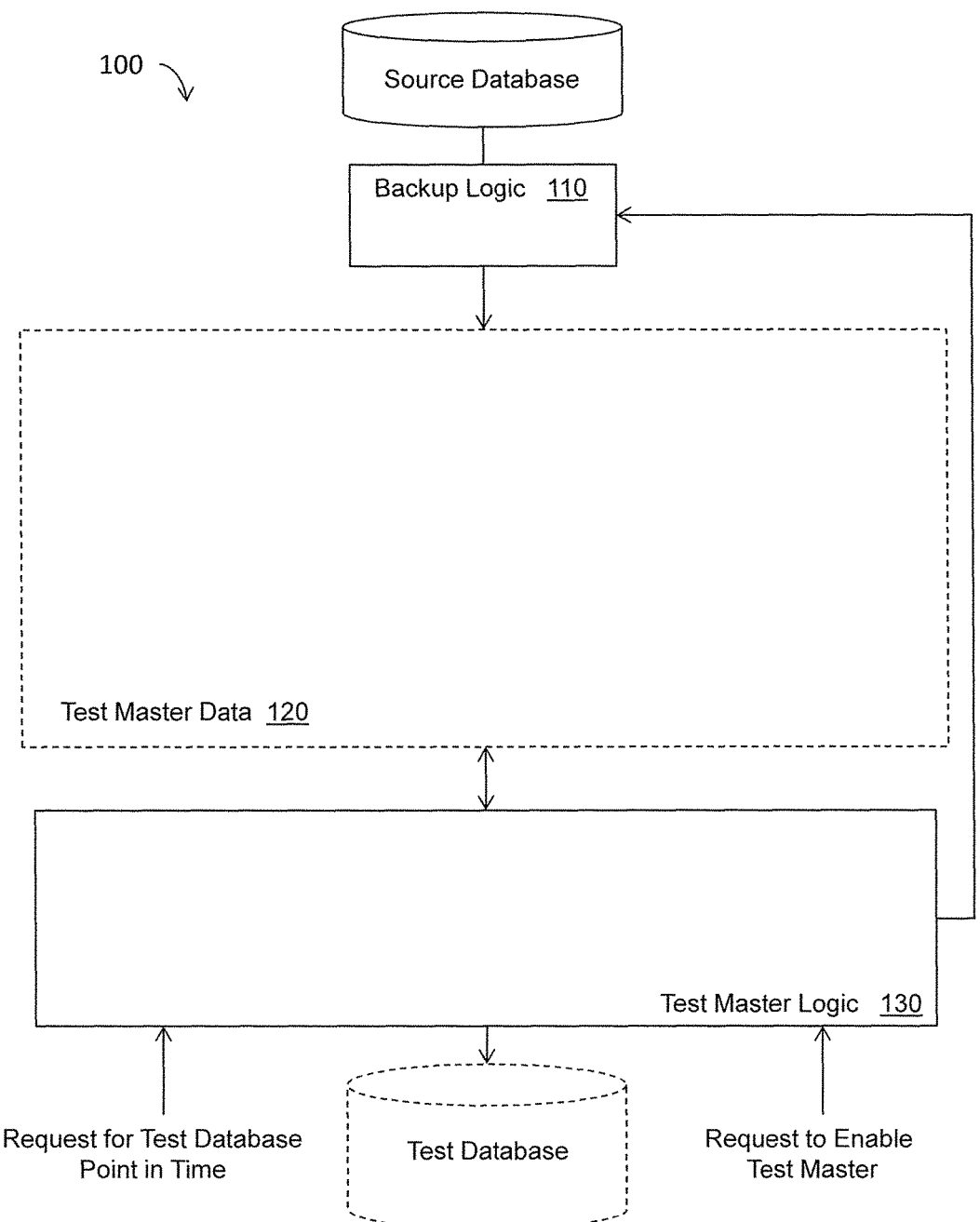
FIG. 1 illustrates one embodiment of a system associated with providing a synchronized test master of a source database.

With reference to FIG. 1, one embodiment of a system 100 configured to provide a test master (described by test master data 120) that is synchronized with a source database is illustrated. The system 100 includes backup logic 110, test master data 120, and test master logic 130. The test master logic 130 periodically actuates the backup logic 110 to backup the source database. Backup data generated by the backup logic 110 as well as additional data (e.g., snapshots) generated by the test master logic 130 is stored in test master data 120 to keep the test master in sync with the source database. The test master logic 130 is configured to receive requests for a test database as of a point-in-time and to create a test database using the test master data 120. While the test database behaves identically to the source database from the perspective of a user, the test database is not a dedicated copy of the source database.

In one embodiment, the backup logic 110 is embodied in an Oracle Enterprise Manager backup application or tool, such as Recovery Manager (RMAN). When the backup logic 110 is RMAN, a current system change number (SCN) and timestamp for the current backup operation is stored in the test master data 120. RMAN uses an RMAN tag to take backups. The RMAN tag is also stored in the test master data 120. Other backup or recovery applications may be used to implement the backup logic 110.

The test master data 120 is stored in an Enterprise Manager repository. The test master data 120 is stored in storage hardware that is registered with Enterprise Manager's Storage Management Framework (SMF), which provides services that are used to maintain the test master data 120 and to create a clone of the test master data volume that is used as a test database. SMF services that are used in this embodiment include: Create Volume, Clone Volume, Resize Volume, Delete Volume, Snapshot Volume, Delete Snapshot, and Mount/Dismount Volume. Throughout this description, reference will be made to this specific embodiment. However, it is to be understood that the systems and methods described herein may be implemented utilizing any appropriate database systems and applications.

Figure 2:
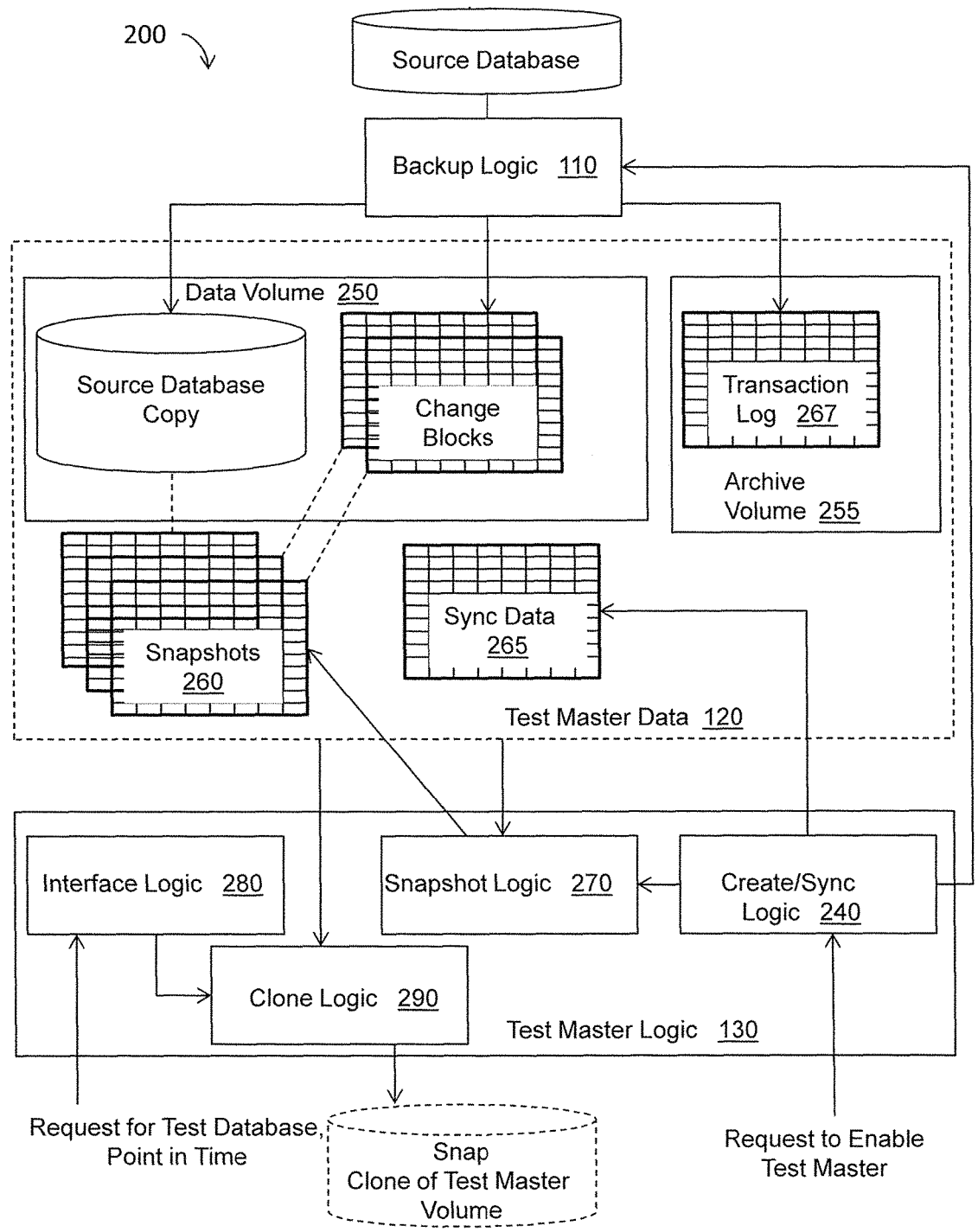
FIG. 2 illustrates another embodiment of a system associated with providing a synchronized test master of a source database.

FIG. 2 illustrates one embodiment of a system 200 that provides a synchronized test master (e.g. test master data 120) of a source database. The system 200 includes a particular embodiment of the backup logic 110, test master data 120, and test master logic 130. To enable creation of a synchronized test master, a request to enable a test master is input to the test master logic 130. The request identifies a test master name and the source database, designates storage media to be used to store the test master data 120 and test databases, and specifies a synchronization schedule.

The test master logic 130 includes create/sync logic 240 that determines the configuration and metric data for the source database based on the name provided in the request to enable. The create/sync logic 240 uses this information to derive the host, the home path, and system identifier (SID) of the source database. The create/sync logic 240 creates a test master data volume 250 and an archive volume 255 with sufficient storage capacity. The create/sync logic 240 mounts the data volume 250 and the archive volume 255 so that the volumes are accessible on the source database host. In one embodiment, the create/sync logic 240 interacts with SMF to create and mount the data volume 250 and the archive volume 255.

Once the data volume 250 and archive volume 255 are created, the create/sync logic 240 triggers (e.g., transmits a request or otherwise actuates or activates) the backup logic 110 to make a full backup copy of the source database data blocks. The test master data 120 reflects the timestamp of the last backup of the source database as will be described in more detail below. The archive volume 255 stores a transaction log 267 that records an accumulation of source database archive logs from each backup performed by the backup logic 110.

In one embodiment, to trigger the backup logic 110, the create/sync logic 240 issues RMAN commands on the source database to copy source database data blocks into the data volume 250. The backup entity created in the RMAN catalog as a result will have the unique RMAN tag identifying it as the backup associated with the test master. If data blocks exist in the destination directory, RMAN creates a level 1 incremental backup, which is used to update the data volume 250. If no data blocks exist in the destination directory (i.e., during the creation of the test master), RMAN will automatically create a level 0 backup (e.g., full copy) of the source database in the destination directory. The following RMAN command creates a level 1 backup of the source database:

backup format '<data_dir>/% U' incremental level 1 for recover of copy with tag <tag>
datafilecopy format '<data_dir>/ts_% N-data_% f.dbf' database;
recover copy of database with tag <tag>;
delete force noprompt backuppiece tag <tag>;

The following RMAN command creates a backup of the source database control file, which is also stored in the data volume 250:

backup format '<datadir>/control01.ctl'
as copy current controlfile tag <tag> reuse The following RMAN command backs up available archive logs, which are stored in the archive volume 255:

backup format '<archives_dir>/archives_% U'
as backupset tag <tag> archive all;

After the initial backup of the archive logs performed in response to the above command, on subsequent sync operations, the following RMAN command is used to back up archive logs for each thread based on a sequence number for the thread:

backup format '<archives_dir>/archives % U'
as backupset tag <tag> archive from
sequence <sequence> thread <thread>;

The above command backs up the source database archive logs based on sequence number so that the backup of the archive logs begins at the next archive log entry that occurred after the previous back up.

Once the backup of the source database is complete, the create/sync logic 240 uploads the source database's system change number (SCN) into sync data 265 which is a data structure stored in the test master data 120 so that the appropriate backup may be selected for a requested point-in-time of the source database. The sync data 265 data structure stores the SCN and timestamp as parameters of the backup run. In one embodiment, the sync data 265 is stored in an Enterprise Manager repository. The sync data 265 may be displayed by user interface logic 280 when interacting with a user requesting a test database. After the sync data 265 for the backup has been stored, the data volume 250 and archive volume 255 are dismounted from the source database host.

As the final step of the creation of the data volume 250 the create/sync logic 240 triggers snapshot logic 270 to take a snapshot of the data volume 250. A snapshot is a data structure storing a set of pointers that record blocks of data in the test master volume when the snapshot was taken. When a block of data is changed after the snapshot is taken, some location in the data volume still stores a version of the data block as of the snapshot time (e.g., the value of the data block when the snapshot was taken). The snapshot points to the blocks of data that hold the version of the data as of the snapshot time.

In one embodiment, the snapshot is a service provided by SMF in which a point-in-time copy of a storage device is created. As writes to the data volume 250 are performed by the backup logic 110, the original data that is being changed by the writes is still referred to by the snapshot. A snapshot is a read-only entity that points to data in the data volume 250. As changes to the data blocks in the data volume 250 occur, SMF causes the older data to be retained in the data volume 250 because the data is referred to by a snapshot of a data volume. The old data is written to a different location in the data volume 250. The new data is written over the old data in the original location. The snapshot will point to the different location that stores the old data instead of the original location of the data, which now stores the new value. When an SMF service is used to create the snapshot, the test master data, including the snapshots, can be created on any storage hardware (e.g., NetApp or EMC) supported by SMF.

In order to keep the test master data volume 250 and archive volume 255 synchronized with the source database, the create/sync logic 240 periodically repeats the process outlined above, backing up the source database and archive logs, updating the data volume 250 and archive volume 255 based on the backup, and taking a snapshot of the resulting synchronized data volume. The synchronization of the data volume 250 and archive volume 255 and the source database is performed according to the synchronization schedule that was included in the request to enable a test master. A manual synchronization may be performed on demand by invoking a manual synchronization feature provided by the test master logic 130 and designating a desired test master data volume to be synchronized.

In one embodiment the backup performed by backup logic 110 on each synchronization operation is an incremental backup. In an incremental backup, the backup logic 110 identifies data blocks in the source database that have been modified or added since the last backup. Rather than modifying the source database copy to reflect the modifications and additions, the backup logic 110 stores "change blocks" of data in the data volume 250 corresponding to the modified or new data blocks in the source database. The time stamp in the records in the source database copy are changed to reflect the backup time. With each synchronization, a new set of change blocks and a new snapshot 260 is added to the test master data 120 as shown in FIG. 2.

Figure 3:
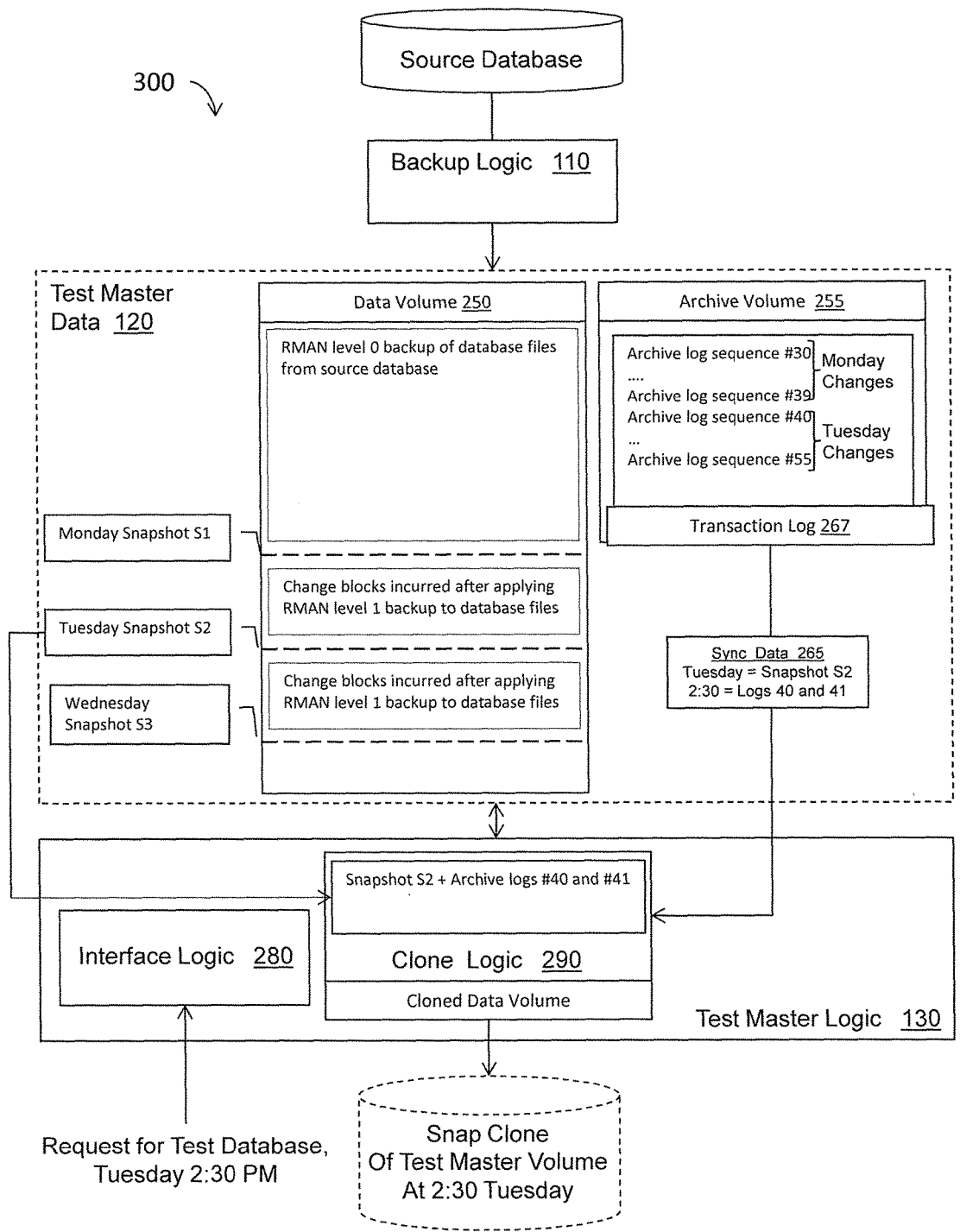
FIG. 3 illustrates one example of the system of FIG. 2 providing a snap clone of the test master for use as a test database.

Referring to FIG. 3, one embodiment of a test master system 300 is shown that schematically illustrates how the contents of the test master data 120 change with time when a daily synchronization is performed. The test master data 120 begins as an "empty" test master data volume 250 and test master archive volume 255. During initial population of the data volume 250, which occurs at midnight Sunday, RMAN (e.g., backup logic 110) creates a level 0 backup of the source database and stores the resulting copy of the source database in the data volume 250. The transaction log 267 contains a copy of the archive logs for the source database as of the backup time. A snapshot S1 is taken at this time, which maintains a record of the data as it existed at the very beginning of the day on Monday. Sync data that identifies the point-in-time at which snapshot S1 was taken (e.g., SCN and/or timestamp data) is recorded in the sync data 265. Recall that a snapshot is essentially a read-only full database backup at the snapshot time but only incurring the space for storing pointers to data blocks in the data volume 250 at snapshot time.

At midnight on Monday RMAN creates a level 1 incremental backup on the source database. The change blocks incurred during the level 1 incremental backup are stored in the data volume 250. Archive log sequences #30-39 that occurred since the last backup (i.e., during Monday) are copied into the transaction log 267. A snapshot S2 is taken at this time, which maintains a record of the data as it existed at the very beginning of the day on Tuesday. Sync data that identifies the point-in-time at which snapshot S2 was taken (e.g., SCN and/or timestamp data) is recorded in the sync data 265.

The synchronization process is repeated again at midnight on Tuesday. Change blocks for Tuesday are stored in the data volume 250 and archive log sequences #40-55 are stored in the transaction log 267. Snapshot S3 is taken and sync data for snapshot S3 is recorded. At this point, test master data 120 stores data, including the snapshots S1-S3, capable of representing the source database at any point-in-time on Monday or Tuesday.

Returning to FIG. 2, interface logic 280 is configured to receive a request for a test database for a source database. The request specifies test master data to be used to generate the test database and a point-in-time. Interface logic 280 triggers clone logic 290 to provision a snap clone of the data volume 250 using a selected snapshot 260, the transaction log 267, and the sync data 265 in the test master data 120.

A snap clone is a writable cloned volume whose initial contents are the same as the snapshot from which it is created. As writes to the snap clone volume are made, the new data is written into the designated storage space that is set aside for the snap clone.

Acting as the test database, the snap clone provides a view that joins the snapshot and the cloned volume. Thus, changes made to the test database (i.e., cloned volume) occur independently of changes to the data volume. Note that the provisioning of a snap clone does not involve copying any data blocks from the data volume 250, so a snap clone of the test master can be generated quickly. In one embodiment the SMF "clone volume" service is invoked by the clone logic 290 to provide the snap clone of the data volume based on a selected snapshot. When an SMF clone volume service is used, the snap clone can be created on any storage hardware (e.g., NetApp or EMC) supported by SMF.

Returning to FIG. 3 and the example described therein, a request for a test database of the source database as of Tuesday at 2:30 PM is received by the interface logic 280. The request includes a name to be given the test database (e.g., snap clone database name), the destination host for the test database, the file system mount point for the test database, and the amount of writable space to be allocated to the test database. The clone logic 290 uses this information to provision a snap clone with the name provided in the request.

The clone logic 290 accesses the sync data 265 to determine which snapshot to use (e.g., Snapshot S2). The snap clone volume for the selected snapshot is mounted at the destination host. The clone logic 290 accesses the sync data to determine which archive log sequences (e.g., log sequences #40 and #41) should be used to bring the Tuesday snapshot up to date as of 2:30 PM. The clone logic 290 "rolls forward" or updates the test master data 120 as of the Tuesday snapshot by performing the identified data manipulation operations in the cloned volume based on the archive log sequences. The archive volume 255 is mounted on the destination host during the creation of the snap clone to enable the "rolling forward" of the test master data and dismounted when done. In one embodiment, the snap clone is named and registered as a target with Enterprise Manager.

Figure 4:
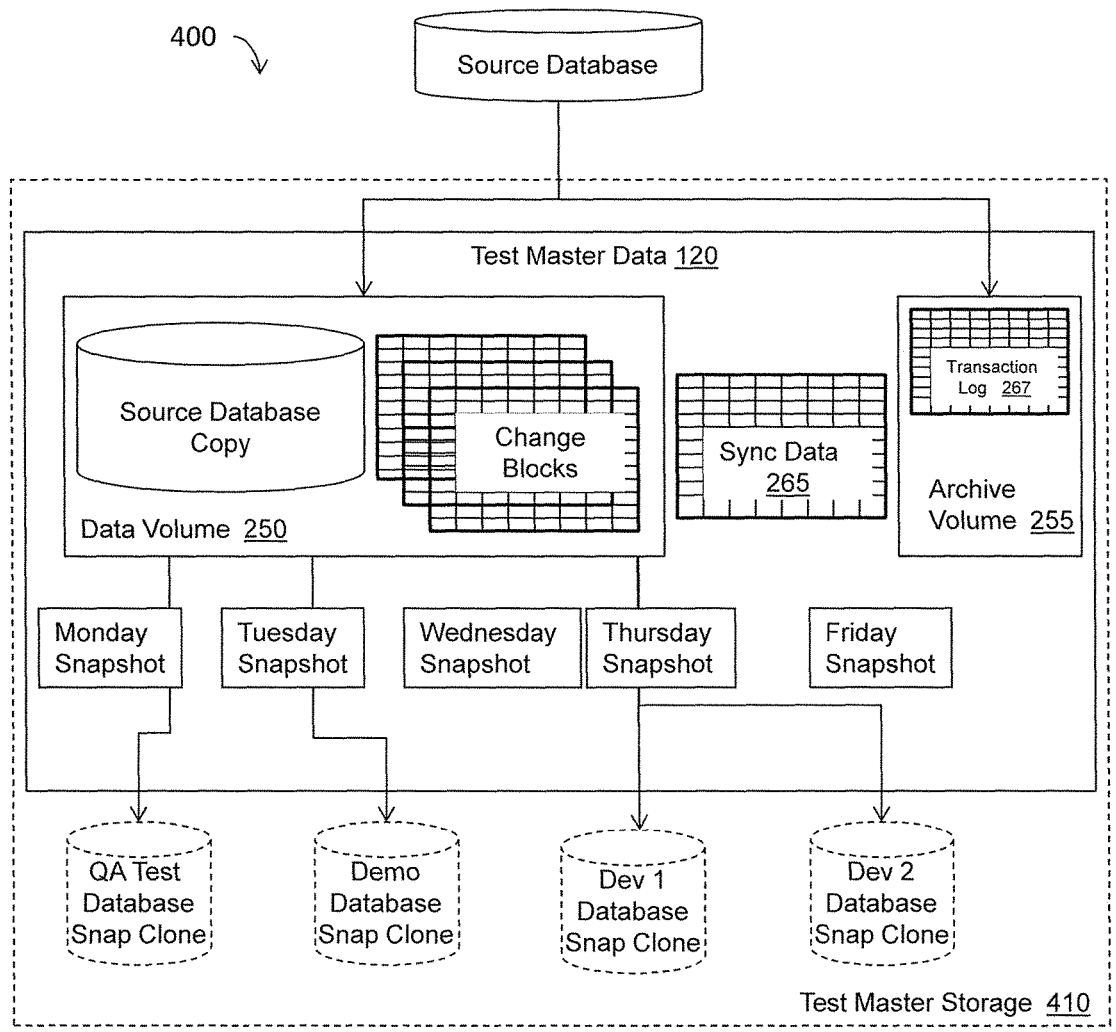
FIG. 4 illustrates one embodiment of a test master providing four snap clones of the test master for use as four different test databases.

FIG. 4 illustrates an example test master system 400 that provides four different test databases using the same data volume 250 and archive volume 255. All of the data used to support the four test databases is stored in test master storage 410. Test master storage 410 includes a single backed up copy of the source database and transaction log 267, sync data 265, snapshots, and snap clones. Recall that snapshots are read-only and snap clones use very little storage space and only store data when data is written to the cloned volume. Further, snap clones can be created almost instantaneously. This means that any number of test databases may be created, on demand, while using only small amounts of storage for each test database. Since the test databases are test instances used for application development or quality control, the number of transactions on the data in the test database will be limited, resulting in a test database that takes up much less storage space than would a copy of the source database.

In one embodiment, the source database is running an Oracle Database version where RMAN is available. RMAN is a backup and recovery tool and is part of the Oracle Database software. RMAN provides a means to maintain the test master data by making a copy of the source database files and periodically updating the copy with incremental changes. RMAN has a catalog that keeps track of all backups issued against the source database. This means that to create and maintain the test master data 120, just the destination location for the test master data is supplied in the RMAN command. RMAN will take care of making sure all files are copied, and if it was a full copy in the previous run (level 0), it will take incremental backups (level 1) in subsequent runs. And since no operating system (OS) level copy commands are running directly, the source database files can be on any type of storage.

In one embodiment, the source database is a managed target within Oracle Enterprise Manager. That means there is an EM agent process running on the source database host. The agent collects information about the source database and also allows remote execution of OS level commands. So based on the information collected, for example location of the Oracle Database software, the appropriate commands can be executed to take the RMAN backup. The host of the source database is also a managed target in Enterprise Manager so that OS commands can be issued to make storage volumes accessible on the host. Enterprise Manager's repository stores the information for managing the lifecycle of test master data and their clones. The interfaces for users to request for and manage these environments are also provided by Enterprise Manager.

This embodiment leverages functionality provided by Storage Management Framework (SMF). SMF is an Enterprise Manager plug-in that extends Enterprise Manager's storage management capabilities. Storage commands are different across different storage hardware types. SMF provides an abstraction layer to various types of storage hardware. For example, a user can register Oracle ZFS storage and NetApp storage with SMF. During test master volume creation process, SMF application programming interfaces (APIs) are invoked to create the storage volumes for the test master data and the cloned volumes and mount the volumes on the appropriate host. The volume and snapshot details are stored in the Enterprise Manager repository. This saves the user from having to run the storage hardware specific storage administration commands and OS administration commands directly.

A test master is an entity that has the following information stored in a metadata repository: name and description, source database and related credentials, storage hardware, volumes and snapshots, synchronization schedule and purge policy, and synchronization runs and associated parameters of each run like the snapshot taken, SCN and timestamp of the RMAN backup. In one embodiment the test master has no compute (i.e. there are no test master OS level processes running on any host) and the storage volumes just contain source database backup files.

After a user submits a test master creation request from the user interface, the entire creation flow is created from end to end without any further user interaction. In the initial creation run, SMF is invoked to create and mount test master storage volumes on the source database host and run RMAN backup commands to copy database and archive files to these volumes. SMF is invoked to take a snapshot of the data volume when done. Since this automated procedure is set on a recurring schedule, the same steps are repeated each time. On subsequent runs, RMAN updates the database files in the data volume instead of replacing entire files. So the delta, or space incurred, between the current storage snapshot and the previous snapshot is the size of the changed blocks only. But at the same time, a series of snapshots is available, with each snapshot reflecting a full set of database backup files. The archive volume on the other hand accumulates archive files from each run. As the number of snapshots grows, space usage of the test master volume will increase. A purge policy should be defined to manage the test master volume size.

A user requests for a test database instance by selecting the test master and a point-in-time (e.g., a SCN or timestamp which is used by the system to select a snapshot and to recover the test database instance). In one embodiment, the user also identifies a particular snapshot to be used to create the snap clone volume. At the OS level, the cloned volume contains a full set of database backup data blocks, but behind the scenes, the cloned volume stores pointers to the base snapshot at the storage level. These database backup data blocks are recovered by applying the appropriate archive logs and starting up a test database instance. As changes are made to the test database data blocks, space usage will come from the space allocated to the cloned volume. But since they are test instances, test databases typically do not experience a large number of transactions. So the used space is usually still less than if the test database included a full copy of the source database. Thus by combining the use of RMAN and storage technologies, a test database instance can be provisioned quickly and cheaply.

In one embodiment, the source database is a managed target in Enterprise Manager for which configuration and metric data are collected. The source database is of a version that supports RMAN. The source database archiving mode should be enabled. A block change tracking feature should be enabled on the source database to improve incremental backup performance. There are no restrictions on what storage the source database is running, including databases running on Automatic Storage Management (ASM) disks. The source database host and the hosts for the snap clones should be managed targets in Enterprise Manager. The hosts may be of any Unix/Linux platform as long as the database file format is compatible between the source and the destination platforms.

Figure 5:
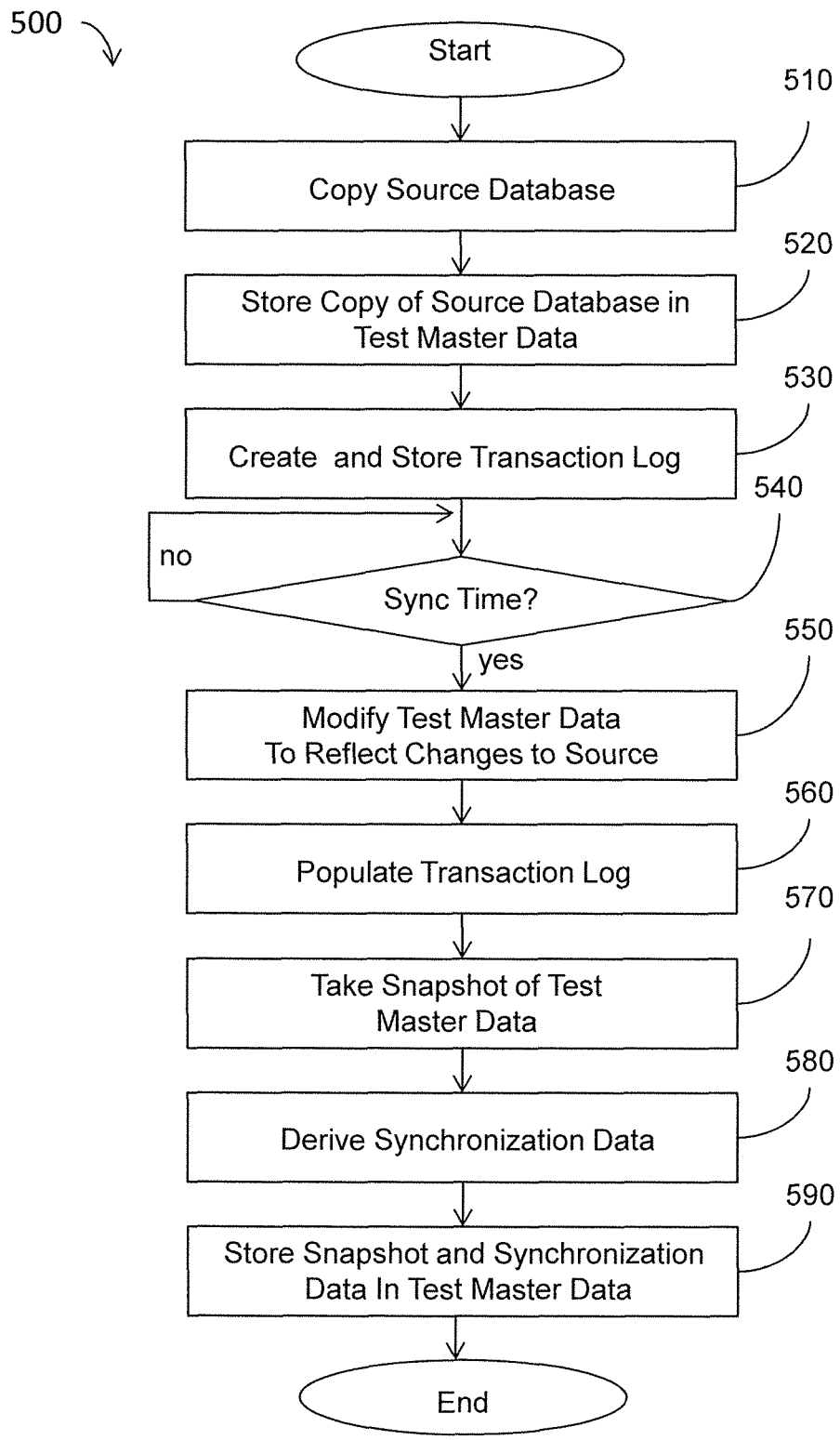
FIG. 5 illustrates one embodiment of a method for synchronizing a test master from a source database to support snap clones of the test master for use as test databases of the source database.

FIG. 5 illustrates one embodiment of a method that maintains test master data for use in providing a test database of a source database that does not require a dedicated copy of the source database. The method includes, at 510, copying data blocks in a source database and, at 520, storing the copied database in test master data. At 530, a transaction log is created and stored in test master data. The transaction log is configured to store data manipulation operations performed on the source database.

Steps 510-530 may be performed in response to a request to enable a test master on an identified source database. Steps 510-530 may be performed by the test master logic 130 of FIGS. 1-4 and/or the create/sync logic 240 of FIG. 2 controlling a processor (see FIG. 7) to perform query operations on the source database configured to make a copy of the data blocks of a source database. The data blocks in the source database are written into storage media and transmitted to the test master data. The data blocks are written into data structures in the test master data. The create/sync logic 240 controls a processor to create a data structure in the archive volume 255 configured to store the archive log as shown in FIGS. 1-3. Data corresponding to transactions occurring on the source database are output by the processor on a port of the source database host and transmitted to the create/sync logic 240, which writes the data in the archive volume 255.

At 540, a determination is made as to whether it is time to synchronize the test master data to the source database. Recall that a synchronization schedule (e.g., daily in the example of FIGS. 3 and 4) is included in the request to enable a test master so that the test master data will be periodically synchronized with the source database. Step 540 may be performed by the test master logic 130 of FIGS. 1-4 and/or the create/sync logic 240 of FIG. 2 controlling a processor (see FIG. 7) to determine whether a scheduled synchronization time has been reached.

When it is time to synchronize the test master data, at 550, the test master data volume is modified to reflect changes to the source database since a last synchronization time and at 560, the transaction log is populated with data manipulation operations performed on the source database since a last transaction time. Steps 550-560 may be performed by the test master logic 130 of FIGS. 1-4 and/or the create/sync logic 240 of FIG. 2 controlling a processor (see FIG. 7) to modify the test master data volume 250 and the test master archive volume 255 of FIG. 1 to reflect changes to the source database and populate the transaction log.

Changes to the source database are detected by issuing queries on the source database for data blocks that have a modification time stamp occurring after the last backup. The queries are transmitted to the source database host. Data corresponding to modified records which are the results of the queries are output by the processor and transmitted to the create/sync logic 240, which writes the data in the data volume 250. Data corresponding to transactions occurring on the source database since the last backup are output by the processor and transmitted to the create/sync logic 240, which writes the data in the archive volume 255.

In one embodiment, modifying the test master data volume to reflect changes to the sourced database is performed in an incremental manner. This embodiment includes identifying modified data blocks in the source database that have been modified or added since a previous synchronization time and storing the modified data blocks in the test master data volume without overwriting original data blocks in the test master data corresponding to the modified data blocks.

In one embodiment, a database backup or recovery application is used to identify data blocks in the source database that have been modified. This embodiment includes triggering a database backup application to perform an incremental backup of the source database to identify the modified data blocks in the source database and receiving data corresponding to the modified data blocks from the database backup application.

At 570, the method includes taking a snapshot of the test master data volume. Recall that the snapshot comprises a set of pointers that record, for all data blocks in the test master data volume, a location in the test master data volume that stores a version of the data block as of the synchronization (or snapshot) time. Step 570 may be performed by the test master logic 130 of FIGS. 1-4 and/or the snapshot logic 270 of FIG. 2 controlling a processor (see FIG. 7) to take a snapshot of the test master data volume 250 of FIG. 2. In one embodiment, an SMF service is invoked to take the snapshot of the test master data volume.

At 580 synchronization data is derived from the transaction log. Recall, from FIGS. 2 and 3 that the synchronization data comprises a snapshot time for the snapshot and a modification time for each data manipulation operation in the transaction log. Step 580 may be performed by the test master logic 130 of FIGS. 1-4 and/or the create/sync logic 240 of FIG. 2 controlling a processor (see FIG. 7) to derive the synchronization data from the transaction log 267 of FIG. 2. The create/sync logic 240 issues queries on a data structure storing metadata associated with the snapshot to identify the snapshot time. The create/sync logic 240 issues queries on a data structure storing the transaction log to identify the modification time for each data manipulation operation.

At 590, the method includes storing the synchronization data and the snapshot in the test master data for use in generating a test database that represents a point-in-time version of the source database. The generating of the test database does not include making a copy of the source database that is dedicated to the test database. Step 590 may be performed by the test master logic 130 of FIGS. 1-4 and/or the create/sync logic 240 of FIG. 2 controlling a processor (see FIG. 7) to store the synchronization data and the snapshot in the test master data 120 of FIG. 1. Storing the synchronization data and the snapshot is performed by writing the data into respective data structures in the test master data.

Figure 6:
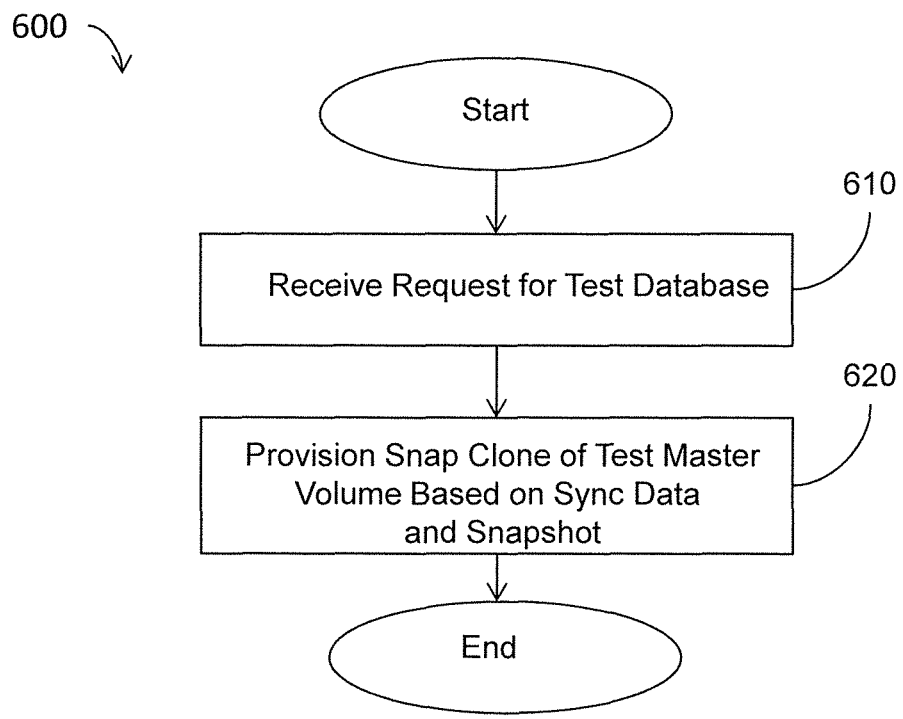
FIG. 6 illustrates one embodiment of a method for generating a snap clone of a test master for use as a test database of a source database.

FIG. 6 illustrates one embodiment of a method 600 that provides a test database that is a snap clone of a snapshot of a test master data volume that is synchronized with the source database. The method includes, at 610, receiving, at a request time, a request for a test database, where the request includes a point-in-time. Step 610 may be performed by the test master logic 130 of FIGS. 1-4 and/or the interface logic 280 of FIG. 2 controlling a processor (see FIG. 7) to receive a communication that includes a request for a test database that has been transmitted over a network connection and buffer the request for execution by the clone logic 290 of FIG. 2.

At 620, a snap clone of the test master as of the given point-in-time is provisioned based, at least in part, on a snapshot and synchronization data. Recall that the snap clone includes a cloned volume configured to record changes to the snapshot and provides a view that joins the snapshot and the cloned volume. Thus, changes made to the test database (i.e., cloned volume) occur independently of changes to the data volume. Step 610 may be performed by the test master logic 130 of FIGS. 1-4 and/or the clone logic 290 of FIG. 2 issuing a command to a processor (see FIG. 7) to provision the snap clone. The command is transmitted over a network connection and buffered for execution by the clone logic 290 of FIG. 2. In one embodiment, step 610 is performed by invoking an SMF "clone volume" service.

In one embodiment, the method 600 includes selecting a most recent snapshot that was taken at a snapshot time prior to the given time; accessing the synchronization data to determine a modification time corresponding to the given point-in-time; identifying data manipulation operations recorded in the transaction log that were performed on the source database since the snapshot time of the selected snapshot; and provisioning the snap clone of the test master based on the snapshot and the data manipulation operations. These steps may be performed by the test master logic 130 of FIGS. 1-4 and/or the clone logic 290 of FIG. 2 controlling a processor (see FIG. 7) to roll the snapshot forward as described above. In one embodiment, these steps are performed by invoking an SMF "clone volume" service.

In one embodiment, the method 600 includes provisioning the snap clone of the test master by: creating a writeable cloned volume using the selected snapshot; starting a test database instance in the cloned volume; recovering the test database instance in the snap clone volume based on the data manipulation operations; providing a view that joins the snapshot and the cloned volume; recording changes to the snap clone in the cloned volume. In this manner, changes made to the test database (i.e., cloned volume) occur independently of changes to the data volume. These steps may be performed by the test master logic 130 of FIGS. 1-4 and/or the clone logic 290 of FIG. 2 controlling a processor (see FIG. 7) to provision the snap clone as described above. In one embodiment, these steps are performed by an SMF "clone volume" service.

It can be seen from the foregoing description that, in one embodiment, the systems and methods described herein combine SMF storage management capabilities and RMAN backup commands to provide the ability to create test master data from a source database, automatically keep the test master data in sync with the source database, take a point-in-time snapshot of the test master data after each synchronization, and make the snapshots available to provision snap clones for use as test databases.

Computing Device Embodiment

Figure 7:
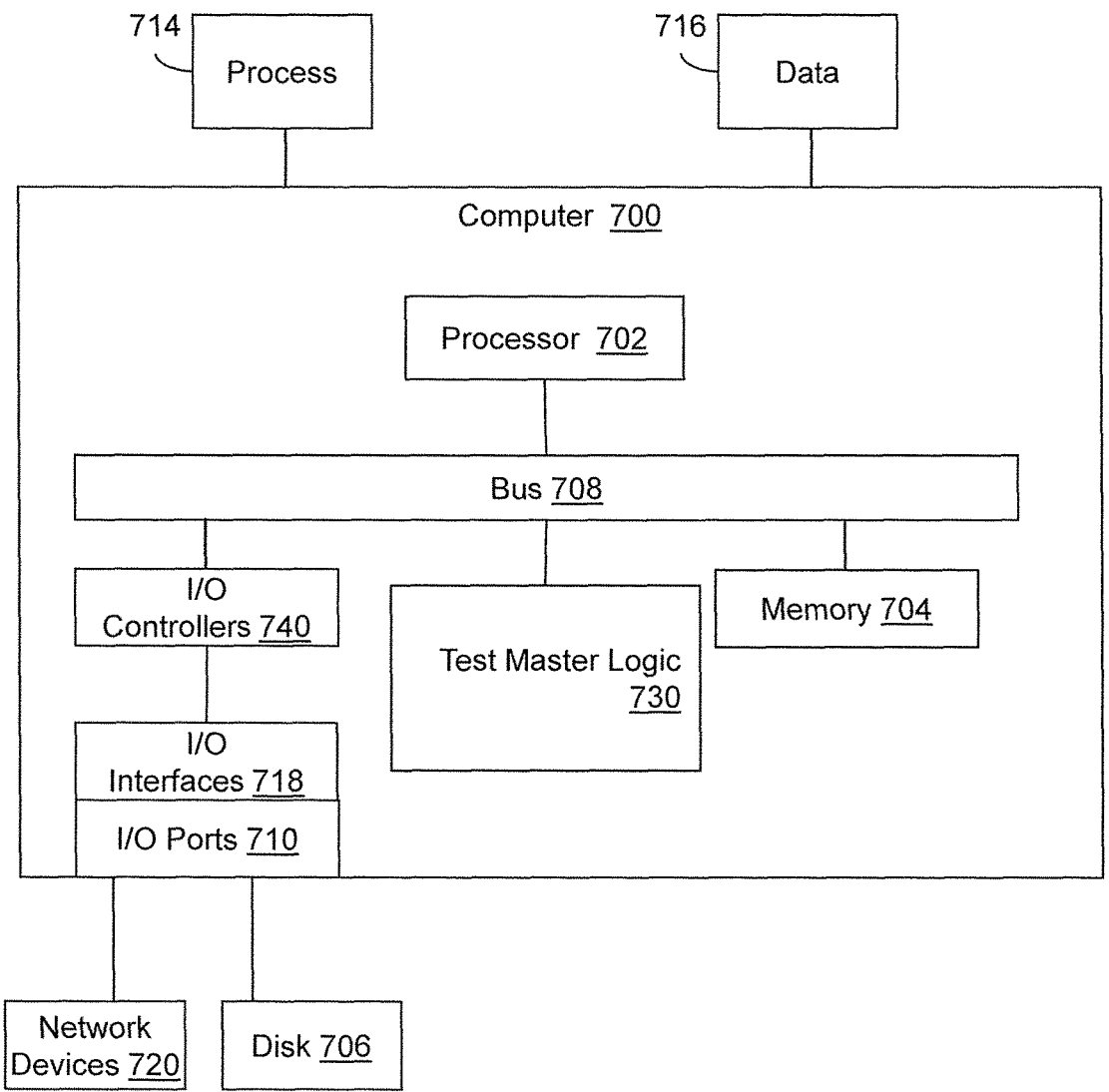
FIG. 7 illustrates an embodiment of a computing system configured with the example systems and/or methods disclosed.

FIG. 7 illustrates an example computing device that is configured and/or programmed with one or more of the example systems and methods described herein, and/or equivalents. The example computing device may be a computer 700 that includes a processor 702, a memory 704, and input/output ports 710 operably connected by a bus 708. In one example, the computer 700 may include test master logic 730 configured to generate test master data and provision test database in a manner similar to the test master logic 110 shown in FIGS. 1-4. In different examples, the test master logic 730 may be implemented in hardware, a non-transitory computer-readable medium with stored instructions, firmware, and/or combinations thereof. While the test master logic 730 is illustrated as a hardware component attached to the bus 708, it is to be appreciated that in other embodiments, the test master logic 730 could be implemented in the processor 702, stored in memory 704, or stored in disk 706.

In one embodiment, test master logic 730 or the computer is a means (e.g., structure: hardware, non-transitory computer-readable medium, firmware) for performing the actions described in FIGS. 1-6. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to perform the methods 500 of FIG. 5 and 600 of FIG. 6, as further explained in FIGS. 1-4. The means may also be implemented as stored computer executable instructions that are presented to computer 700 as data 716 that are temporarily stored in memory 704 and then executed by a processor 702.

Test master logic 730 may also provide means (e.g., hardware, non-transitory computer-readable medium that stores executable instructions, firmware) for performing the methods 500 of FIG. 5 and 600 of FIG. 6, as further explained in FIGS. 1-4.

Generally describing an example configuration of the computer 700, the processor 702 may be a variety of various processors including dual microprocessor and other multiprocessor architectures. A memory 704 may include volatile memory and/or non-volatile memory. Non-volatile memory may include, for example, read only memory (ROM), programmable ROM (PROM), and so on. Volatile memory may include, for example, random access memory (RAM), synchronous random access memory (SRAM), dynamic random access memory (DRAM), and so on.

A storage disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a compact disk-read only memory (CD-ROM) drive, a CD recordable (CD-R) drive, a CD read/write (CD-RW) drive, a digital video disc (DVD) ROM, and so on. The memory 704 can store a process 714 and/or a data 716, for example. The disk 706 and/or the memory 704 can store an operating system that controls and allocates resources of the computer 700.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and universal serial bus (USB) ports.

The computer 700 can operate in a network environment and thus may be connected to the network devices 720 via the I/O interfaces 718, and/or the i/o ports 710. Through the network devices 720, the computer 700 may interact with a network. Through the network, the computer 700 may be logically connected to remote computers. Networks with which the computer 700 may interact include, but are not limited to, a local area network (LAN), a wide area network (WAN), and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

A "data block", as used herein, is an organization of data in a computing system that is stored in a memory, a storage device, or other computerized system. A data block may be a granular quantity of data that is processed by the computing system as a single entity. A data block may be any one of, for example, a data field, a data file, a data array, a data record, a database, a data table, a graph, a tree, a linked list, and so on. A data block may be formed from and contain many other data block (e.g., a database includes many data records). Other examples of data blocks are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a computing device cause the computing device to:
   copy data blocks from a live source database that is changed over time by data manipulation operations;
   store the copied source database data blocks in test master data;
   create a transaction log configured to store data manipulation operations performed on the source database;
   store the transaction log in the test master data;
   periodically synchronize the test master data to the source database by, at a synchronization time:
      modifying the test master data to reflect changes to the source database since a last synchronization time;
      populating the transaction log with data manipulation operations performed on the source database since a last transaction time;
      taking a snapshot of the test master data, where the snapshot comprises a set of pointers that record a location in the test master data that stores a version of data blocks in the test master data as of the synchronization time;
      deriving synchronization data from the transaction log, where the synchronization data comprises:
         a snapshot time for the snapshot, and
         a modification time for each data manipulation operation in the transaction log; and storing the synchronization data and the snapshot in the test master data for use in generating a test database that represents a point-in-time version of the source database, where the generating of the test database comprises using the snapshot, the snapshot time, and one or more data manipulation operations to the source database at one or more modification times occurring after the snapshot time, and where the generating of the test database does not include making a copy of the source database that is dedicated to the test database.

2. The non-transitory computer-readable medium of claim 1, further comprising instructions configured to cause the computing device to synchronize the test master data by:

identifying modified data blocks in the source database that have been modified or added since a previous synchronization time; and storing the modified data blocks in the test master data without overwriting original data blocks in the test master data corresponding to the modified data blocks.

3. The non-transitory computer-readable medium of claim 2, further comprising instructions configured to cause the computing device to:

trigger a database backup application to perform an incremental backup of the source database to identify the modified data blocks in the source database; and receive data corresponding to the modified data blocks from the database backup application.

4. The non-transitory computer-readable medium of claim 1, further comprising instructions configured to cause the computing device to:

receive, at a request time, a request for a test database, where the request includes a point-in-time;

provision a snap clone of the test master data as of the given point-in-time of the source database based, at least in part, on a snapshot and synchronization data, where the snap clone comprises a cloned volume configured to record changes to the test master data made after a snapshot time for the snapshot, further where the snap clone provides a view of the snapshot joined with the cloned volume.

5. The non-transitory computer-readable medium of claim 4, further comprising instructions configured to cause the computing device to:

select a most recent snapshot that was taken at a snapshot time prior to the given time;

access the synchronization data to determine a modification time corresponding to the given point-in-time;

identify data manipulation operations recorded in the transaction log that were performed on the source database since the snapshot time of the selected snapshot; and provision the snap clone of the test master data based on the snapshot and the identified data manipulation operations.

6. The non-transitory computer-readable medium of claim 5, further comprising instructions configured to cause the computing device to provision the snap clone of the test master data by:

creating a writeable cloned volume of the test master data using the selected snapshot;

starting a test database instance in the cloned volume;

recovering the test database instance in the cloned volume based on the identified data manipulation operations;

providing a view that joins the snapshot and the cloned volume; and recording changes to the snap clone in the cloned volume, such that changes made to the cloned volume occur independently of changes to the test master data.

7. The non-transitory computer-readable medium of claim 1, where the modification time is based, at least in part, on a system change number.

8. A computing system, comprising:

create/sync logic configured to:

copy data blocks from a live source database that is changed over time by data manipulation operations;

store the copied source database blocks in test master data;

create a transaction log configured to store data manipulation operations performed on the source database; and periodically synchronize the test master data to the source database by, at a synchronization time:

modifying the test master data to reflect changes to the source database since a last synchronization time; and populating the transaction log with data manipulation operations performed on the source database since a last transaction time; and snapshot logic configured to, in response to a trigger from the create/sync logic, take a snapshot of the test master data, where the snapshot comprises a set of pointers that record, for each block of data that is changed after the synchronization time, a location in the test master data that stores a version of the data block as of the synchronization time; and where the create/sync logic is further configured to, at each synchronization time:

derive synchronization data from the transaction log, where the synchronization data comprises:

a snapshot time for the snapshot, and a modification time for each data manipulation operation in the transaction log; and store the synchronization data and the snapshot for use in generating a test database that represents a version of the test master synchronized with the source database, where the generating of the test database comprises using the snapshot, the snapshot time, and one or more data manipulations at one or more modification times occurring after the snapshot time, and where the generating of the test database does not include making a copy of the source database that is dedicated to the test database.

9. The computing system of claim 8, where the create/sync logic is further configured to:

identify modified data blocks in the source database that have been modified or added since a previous synchronization time; and store the modified data blocks in the test master data without overwriting original data blocks in the test master data corresponding to the modified data blocks.

10. The computing system of claim 8, where the create/sync logic is further configured to:

trigger a database backup application to perform an incremental backup of the source database to identify the modified data blocks in the source database; and receive data corresponding to the modified data blocks from the database backup application.

11. The computing system of claim 8, further comprising:

interface logic configured to receive, at a request time, a request for a test database, where the request includes a point-in-time; and clone logic configured to, in response to a trigger from the interface logic, provision a snap clone of the test master as of the given point-in-time of the source database based, at least in part, on a snapshot and synchronization data, where the snap clone comprises a cloned volume configured to record changes to the test master data made after a snapshot time of the snapshot, further where the snap clone provides a view of the snapshot joined with the cloned volume.

12. The computing system of claim 11, where the clone logic is further configured to:

select a most recent snapshot that was taken at a snapshot time prior to the given time;

access the synchronization data to determine a modification time corresponding to the given point-in-time;

identify data manipulation operations recorded in the transaction log that were performed on the source database since the snapshot time of the selected snapshot; and provision the snap clone of the test master data based on the snapshot and the identified data manipulation operations.

13. The computing system of claim 12, where the clone logic is further configured to:

create a writeable cloned volume of the test master data using the selected snapshot;

start a test database instance in the cloned volume;

recover the test database instance in the cloned volume based on the identified data manipulation operations;

provide a view that joins the snapshot and the cloned volume; and record changes to the snap clone in the cloned volume, such that changes made to the cloned volume occur independently of changes to the test master data.

14. A computer-implemented method, the method comprising:

copying data blocks from a live source database that is changed over time by data manipulation operations;

storing copied source database data blocks in test master data;

creating a transaction log configured to store data manipulation operations performed on the source database;

storing the transaction log in the test master data;

periodically synchronizing the test master data to the source database by, at a synchronization time:

modifying the test master data to reflect changes to the source database since a last synchronization time;

populating the transaction log with data manipulation operations performed on the source database since a last transaction time;

taking a snapshot of the test master data, where the snapshot comprises a set of pointers that record a location in the test master data that stores a version of data blocks in the test master data as of the synchronization time;

deriving synchronization data from the transaction log, where the synchronization data comprises:

a snapshot time for the snapshot, and a modification time for each data manipulation operation in the transaction log;

storing the synchronization data and the snapshot in the test master data for use in generating a test database that represents a point-in-time version of the source database, where the generating of the test database comprises using the snapshot, the snapshot time, and one or more data manipulations at one or more modification times occurring after the snapshot time, and where the generating of the test database does not include making a copy of the source database that is dedicated to the test database.

15. The computer-implemented method of claim 14, further comprising synchronizing the test master data by:

identifying modified data blocks in the source database that have been modified or added since a previous synchronization time; and storing the modified data blocks in the test master data without overwriting original data blocks in the test master data corresponding to the modified data blocks.

16. The computer-implemented method of claim 15, further comprising:

triggering a database backup application to perform an incremental backup of the source database to identify the modified data blocks in the source database; and receiving data corresponding to the modified data blocks from the database backup application.

17. The computer-implemented method of claim 14, further comprising:

receiving, at a request time, a request for a test database, where the request includes a point-in-time;

provisioning a snap clone of the test master data as of the given point-in-time of the source database based, at least in part, on a snapshot and synchronization data, where the snap clone comprises a cloned volume configured to record changes to the test master data made after a snapshot time for the snapshot, further where the snap clone provides a view of the snapshot joined with the cloned volume.

18. The computer-implemented method of claim 17, further comprising:

selecting a most recent snapshot that was taken at a snapshot time prior to the given time;

accessing the synchronization data to determine a modification time corresponding to the given point-in-time;

identifying data manipulation operations recorded in the transaction log that were performed on the source database since the snapshot time of the selected snapshot; and provisioning the snap clone of the test master data based on the snapshot and the identified data manipulation operations.

19. The computer-implemented method of claim 18, further comprising provisioning the snap clone of the test master data by:

creating a writeable cloned volume of the test master data using the selected snapshot;

starting a test database instance in the cloned volume;

recovering the test database instance in the cloned volume based on the identified data manipulation operations;

providing a view that joins the snapshot and the cloned volume; and recording changes to the snap clone in the cloned volume, such that changes made to the cloned volume occur independently of changes to the test master data.

20. The computer-implemented method of claim 14, where the modification time is based, at least in part, on a system change number.

* * * * *